(12) United States Patent
Newhouse et al.

(10) Patent No.: US 9,118,970 B2
(45) Date of Patent: Aug. 25, 2015

(54) SYSTEM AND METHOD FOR EMBEDDING AND VIEWING MEDIA FILES WITHIN A VIRTUAL AND AUGMENTED REALITY SCENE

(75) Inventors: Benjamin Zeis Newhouse, San Francisco, CA (US); Terrence Edward McArdle, San Francisco, CA (US)

(73) Assignee: Aria Glassworks, Inc., San Francisco, CA (US)

( * ) Notice: Subject to any disclaimer, the term of this patent is extended or adjusted under 35 U.S.C. 154(b) by 116 days.

(21) Appl. No.: 13/411,347

(22) Filed: Mar. 2, 2012

(65) Prior Publication Data

US 2012/0236029 A1   Sep. 20, 2012

Related U.S. Application Data

(60) Provisional application No. 61/448,327, filed on Mar. 2, 2011, provisional application No. 61/451,071, filed on Mar. 9, 2011.

(51) Int. Cl.
*G09G 5/14* (2006.01)
*H04N 21/4725* (2011.01)
*H04N 21/414* (2011.01)
*H04N 21/422* (2011.01)
(Continued)

(52) U.S. Cl.
CPC ..... *H04N 21/4725* (2013.01); *H04N 21/41407* (2013.01); *H04N 21/4223* (2013.01); *H04N 21/42202* (2013.01); *H04N 21/4312* (2013.01)

(58) Field of Classification Search
CPC .................................................. G06T 19/006
USPC ......................................................... 345/633
See application file for complete search history.

(56) References Cited

U.S. PATENT DOCUMENTS 5,287,437 A   2/1994  Deering
5,841,439 A   11/1998  Pose et al.
(Continued)

FOREIGN PATENT DOCUMENTS

WO   2008107553 A   9/2008

OTHER PUBLICATIONS

Easypano Holdings Inc, "Panoweaver 6.00 User Manual", Copyright Easypano Holdings Inc., date unknown, downloaded from http://web.archive.org/web/20090711113513/http://www.easypano.com/download/doc/pw600_manual.pdf with an archive.orgverified date of Jul. 11, 2009, pp. 24-74.
(Continued)

*Primary Examiner* — Javid A Amini
(74) *Attorney, Agent, or Firm* — Kilpatrick Townsend & Stockton LLP

(57) ABSTRACT

A preferred method for viewing embedded media in a virtual and augmented reality (VAR) scene can include at a viewer device, defining a real orientation of the viewer device relative to a projection matrix; and orienting a VAR scene on the viewer device in response to the real orientation in block, in which the VAR scene includes one or both of visual data and orientation data. The preferred method can further include selecting a media file in the VAR scene, wherein the media file is selected at a media location correlated at least to the real orientation of the viewer device; and activating the media file in the VAR scene at the media location. The preferred method and variations thereof functions to allow a viewer to interact with media that is embedded, tagged, linked, and/or associated with a VAR scene viewable on the viewer device.

15 Claims, 7 Drawing Sheets

(51) Int. Cl.
*H04N 21/4223* (2011.01)
*H04N 21/431* (2011.01)

(56) References Cited

U.S. PATENT DOCUMENTS

| | | | |
|---|---|---|---|
| 5,990,941 | A | 11/1999 | Jackson et al. |
| 6,226,669 | B1 | 5/2001 | Huang et al. |
| 6,389,179 | B1 * | 5/2002 | Katayama et al. ............ 382/284 |
| 6,760,026 | B2 | 7/2004 | Li et al. |
| 7,133,068 | B2 | 11/2006 | Fisher et al. |
| 7,224,326 | B2 * | 5/2007 | Sefton .............................. 345/8 |
| 7,389,591 | B2 | 6/2008 | Jaiswal et al. |
| 7,424,218 | B2 | 9/2008 | Baudisch et al. |
| 7,499,586 | B2 | 3/2009 | Agarwala et al. |
| 7,564,469 | B2 | 7/2009 | Cohen |
| 8,041,574 | B2 | 10/2011 | Yano |
| 8,144,232 | B2 * | 3/2012 | Larson et al. ............ 348/333.05 |
| 8,301,159 | B2 | 10/2012 | Hamynen et al. |
| 8,373,573 | B2 | 2/2013 | Chou et al. |
| 8,384,718 | B2 | 2/2013 | Dahlke |
| 8,730,156 | B2 | 5/2014 | Weising et al. |
| 2001/0030693 | A1 | 10/2001 | Fisher et al. |
| 2002/0140666 | A1 | 10/2002 | Bradski |
| 2002/0158873 | A1 | 10/2002 | Williamson |
| 2004/0027330 | A1 * | 2/2004 | Bradski ........................ 345/158 |
| 2005/0219239 | A1 | 10/2005 | Mashitani et al. |
| 2005/0286125 | A1 | 12/2005 | Sundstrom et al. |
| 2006/0050140 | A1 | 3/2006 | Shin et al. |
| 2006/0082692 | A1 | 4/2006 | Kamijima et al. |
| 2007/0025723 | A1 * | 2/2007 | Baudisch et al. ............ 396/287 |
| 2007/0035562 | A1 * | 2/2007 | Azuma et al. ................ 345/633 |
| 2007/0076016 | A1 | 4/2007 | Agarwala et al. |
| 2007/0103543 | A1 * | 5/2007 | Anderson et al. ............... 348/36 |
| 2007/0168418 | A1 | 7/2007 | Ratnakar |
| 2007/0236493 | A1 | 10/2007 | Horiuchi et al. |
| 2008/0042973 | A1 | 2/2008 | Zhao et al. |
| 2008/0071559 | A1 | 3/2008 | Arrasvuori |
| 2008/0082692 | A1 | 4/2008 | Yano |
| 2008/0094417 | A1 | 4/2008 | Cohen |
| 2008/0194323 | A1 | 8/2008 | Merkli et al. |
| 2008/0266326 | A1 | 10/2008 | Porwal |
| 2008/0280676 | A1 | 11/2008 | Distanik et al. |
| 2008/0292131 | A1 | 11/2008 | Takemoto et al. |
| 2008/0309508 | A1 | 12/2008 | Harmon |
| 2008/0320422 | A1 | 12/2008 | Cazeaux |
| 2009/0140887 | A1 | 6/2009 | Breed et al. |
| 2009/0237564 | A1 | 9/2009 | Kikinis et al. |
| 2009/0240431 | A1 * | 9/2009 | Chau et al. .................... 701/208 |
| 2009/0244097 | A1 | 10/2009 | Estevez ........................ 345/633 |
| 2009/0292774 | A1 * | 11/2009 | Box et al. ...................... 709/206 |
| 2010/0001980 | A1 | 1/2010 | Kim et al. |
| 2010/0002122 | A1 | 1/2010 | Larson et al. |
| 2010/0007657 | A1 | 1/2010 | Rurin |
| 2010/0066763 | A1 | 3/2010 | Macdougall et al. |
| 2010/0092079 | A1 * | 4/2010 | Aller .............................. 382/165 |
| 2010/0125816 | A1 * | 5/2010 | Bezos ........................... 715/863 |
| 2010/0161658 | A1 | 6/2010 | Hamynen et al. |
| 2010/0169837 | A1 | 7/2010 | Hyndman |
| 2010/0171758 | A1 | 7/2010 | Maassel et al. |
| 2010/0188397 | A1 * | 7/2010 | Tsai et al. ..................... 345/419 |
| 2010/0214111 | A1 * | 8/2010 | Schuler et al. ............. 340/686.1 |
| 2010/0228633 | A1 | 9/2010 | Guimaraes et al. |
| 2010/0287485 | A1 * | 11/2010 | Bertolami et al. ............ 715/764 |
| 2011/0041060 | A1 * | 2/2011 | Chien et al. ................... 715/716 |
| 2011/0090252 | A1 | 4/2011 | Yoon et al. |
| 2011/0164116 | A1 | 7/2011 | Gay et al. |
| 2011/0201362 | A1 * | 8/2011 | Bregman-Amitai et al. . 455/466 |
| 2011/0213861 | A1 | 9/2011 | Fanelli et al. |
| 2011/0242134 | A1 | 10/2011 | Miller et al. |
| 2011/0248987 | A1 * | 10/2011 | Mitchell ....................... 345/419 |
| 2011/0273451 | A1 | 11/2011 | Salemann |
| 2012/0086728 | A1 * | 4/2012 | McArdle et al. .............. 345/633 |
| 2012/0105440 | A1 | 5/2012 | Lieberman et al. |
| 2012/0113264 | A1 | 5/2012 | Moshrefi et al. |
| 2012/0212405 | A1 | 8/2012 | Newhouse et al. |
| 2012/0214590 | A1 | 8/2012 | Newhouse et al. |
| 2012/0218306 | A1 | 8/2012 | McArdle et al. |
| 2012/0242656 | A1 | 9/2012 | McArdle et al. |
| 2012/0242798 | A1 | 9/2012 | McArdle et al. |
| 2012/0246223 | A1 | 9/2012 | Newhouse et al. |
| 2014/0092135 | A1 | 4/2014 | McArdle et al. |
| 2014/0267418 | A1 | 9/2014 | McArdle et al. |

OTHER PUBLICATIONS

Hewlett Packard, "HP Photosmart R717 Digital Camera with HP Instant Share User's Manual", Copyright 2005 Hewlett-Packard Development Company, L.P., downloaded from http://h1 0032.www1.hp.com/ctg/Manual/c00298985.pdf on May 3, 2013, pp. 50-54.

Ducket, Jon, "Beginning HTML, XHTML, CSS, and JavaScript (R)," Dec. 30, 2009, Wrox, p. 234.

"Motion Control Simulation Applet" http://ir.exp.sis.pitt.edu/res2/data/is/group5/. Archived on Sep. 1, 2006. Retrieved on Nov. 5, 2013 from <https://web.archive.org/web/20060901110520/http://ir.exp.sis.pitt.edu/res2/data/is/group5/>.

"Rotations and Euler angles" http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.

Hwang et al. "Hand-held virtual reality: a feasibility study." Proceedings of the ACM symposium on Virtual reality software and technology. ACM, 2006.

Fauster, Loris, and T. U. Wien. "Stereoscopic techniques in computer graphics." Tu Wien (2007), 10 pages.

Kanbara, Masayuki, et al. "A stereoscopic video see-through augmented reality system based on real-time vision-based registration." Virtual Reality, 2000. Proceedings. IEEE. IEEE, 2000, 8 pages.

Parr62, Ben; "EASTER EGG: Yelp Is the iPhone's First Augmented Reality App,"; located at https://web.archive.org/web/20090829094113/http://mashable.com/2009/08/2007/yelp-aug . . . ; Aug. 27, 2009; 10 pages.

Hildenbrand, Jerry; "Yelp 2.0 brings monocle and checkins to its Android Client,"; located at http://www.androidcentral.com/yelp-20-brings-monocle-andcheckins-its-android-client; Jul. 5, 2010; 10 pages.

* cited by examiner

SYSTEM AND METHOD FOR EMBEDDING AND VIEWING MEDIA FILES WITHIN A VIRTUAL AND AUGMENTED REALITY SCENE

CLAIM OF PRIORITY

The present application claims priority to: U.S. Provisional Patent Application Ser. No. 61/448,327, filed on 2 Mar. 2011 and entitled "Method for Linking Media in Virtual and Augmented Reality Scenes" the entirety of which is incorporated herein by this reference; and U.S. Provisional Patent Application Ser. No. 61/451,071, filed on 9 Mar. 2011 and entitled "Method for Linking Media in Virtual and Augmented Reality Scenes" the entirety of which is incorporated herein by this reference

TECHNICAL FIELD

This invention relates generally to the virtual and augmented reality field, and more specifically to a new and useful system and method for distributing virtual and augmented reality scenes through a social network.

BACKGROUND AND SUMMARY

The capability to view augmented reality on mobile devices has been increasing in recent years. The data viewable with these augmented reality devices have largely been controlled by large entities, and as there use has largely been adjusted specifically for the purposes of that entity. The public has not had technology readily available to them to simply create such virtual and augmented reality scenes and to embed and/or interact with the virtual and augmented reality scenes through other media. Thus, there is a need in the virtual and augmented reality field for new and useful systems and methods for embedding and viewing media within virtual and augmented reality scenes. This invention provides such a new and useful system and/or method, the details of which are described below in its preferred embodiments with reference to the following drawings.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Systems

Figure 1:
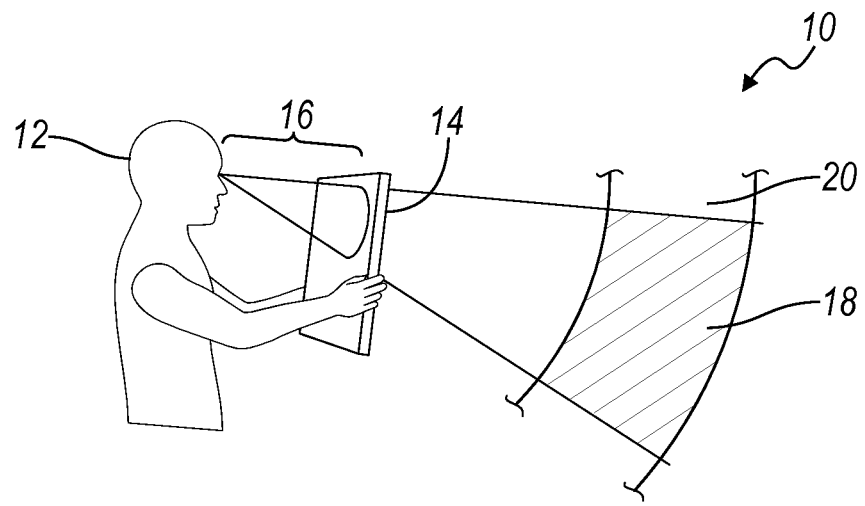
FIG. 1 is a schematic diagram of a system and/or device according to a preferred embodiment of the present invention.
Figure 2:
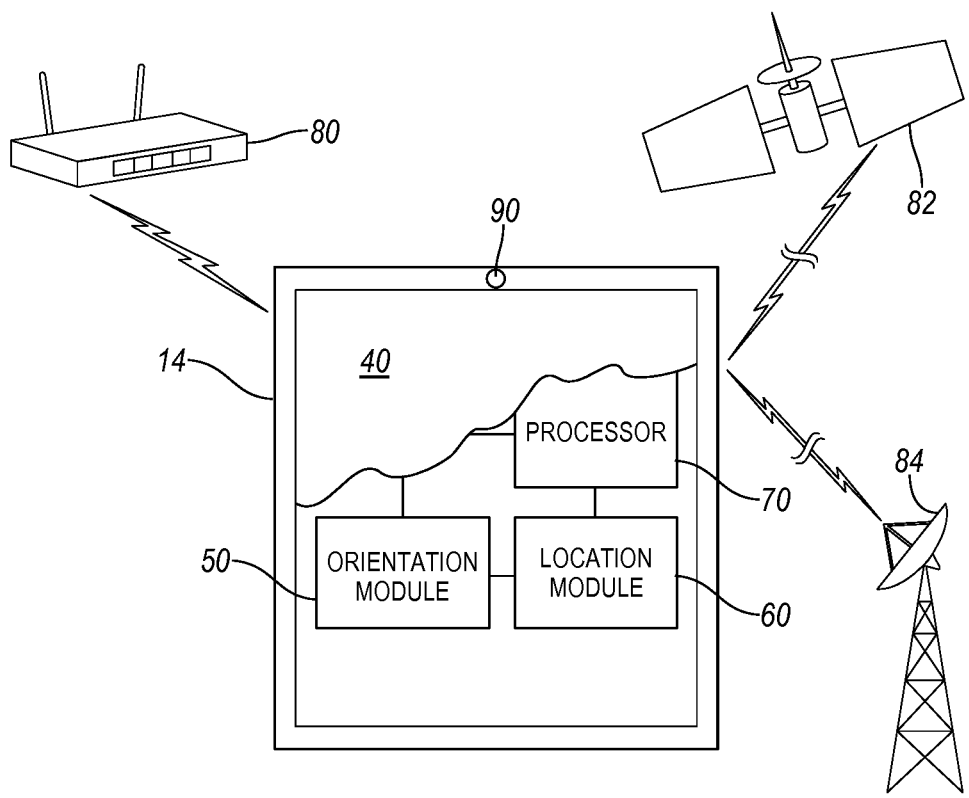
FIG. 2 is a schematic diagram of a system, device, and/or operating environment according to a preferred embodiment of the present invention.

As shown in FIGS. 1 and 2, a system 10 of a preferred embodiment can include a device 14 for embedding and/or viewing media files in virtual and augmented reality (VAR) scenes. As used herein, the user device 14 and the viewer device 14 are defined in terms of the function being performed by the respective user/viewer, and each type of device 14 is interchangeable with the other as described herein depending upon the use the device 14 is being put to by the user/viewer. The preferred user device 14 can be used by a user to capture, process, create, and/or generate a viewable scene, such as for example a VAR scene, and to generate, place, position, embed and/or actuate one or more media files inside the VAR scene. The preferred viewer device 14 can be used by a viewer to receive, process, orient, render, generate, and/or view a viewable scene, such as for example a VAR scene, and to render, view, activate, and/or interact with one or more media files inside the VAR scene.

Preferably, the user device 14 and the viewer device 14 are substantially similar. One or both of the user device 14 and the viewer device 14 can include one or more cameras (front/rear), an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any suitable combination thereof for calculating a projection matrix and/or the associated Euler angles. In the user device 14 and/or the viewer device 14, orientation and/or position information can be gathered in any suitable fashion, including device Application Programming Interfaces (API) or through any suitable API exposing device information, e.g., using Flash or HTML5 to expose device information including orientation/location.

As shown in FIG. 1, in one the device 14 of the preferred embodiment, the VAR scene can include a spherical image 20. Preferably, the portion of the spherical image (i.e., the VAR scene 18) that is displayable by the device 14 corresponds to an overlap between a viewing frustum of the device (i.e., a viewing cone projected from the device) and the imaginary sphere that includes the spherical image 20. The scene 18 is preferably a portion of the spherical image 20, which can include a substantially rectangular display of a concave, convex, or hyperbolic rectangular portion of the sphere of the spherical image 20. Preferably, the nodal point is disposed at approximately the origin of the spherical image 20, such that a viewer 12 has the illusion of being located at the center of a larger sphere or bubble having the VAR scene displayed on its interior. Alternatively, the nodal point can be disposed at any other suitable vantage point within the spherical image 20 displayable by the device 14. In another alternative, the displayable scene can include a substantially planar and/or ribbon-like geometry from which the nodal point is distanced in a constant or variable fashion. Preferably, the display of the scene 18 can be performed within a 3D or 2D graphics platform such as OpenGL, WebGL, or Direct 3D. Alternatively, the display of the scene 18 can be performed within a browser environment using one or more of Flash, HTML5, CSS3, or any other suitable markup language. In another variation of the device 14 of the preferred embodiment, the geometry of the displayable scene can be altered and/or varied in response to an automated input and/or in response to a user input.

As shown in FIG. 2, the (user and/or viewer mobile) device 14 of the preferred embodiment can include a display 40, an orientation module 50 including a real orientation module and a user orientation module, a location module 60, a camera 90 oriented in substantially the same direction as the display 40, and a processor 70 connected to each of the display, orientation module 50, location module 60, and camera 90. The device 14 of the preferred embodiment preferably functions to capture and/or present a VAR scene to a user from the point of view of a nodal point or center thereof, such that it appears to the user that he or she is viewing the world (represented by the VAR scene) through a frame of a window. The device 14 of the preferred embodiment can include any suitable type of mobile computing apparatus such as a smart phone, a personal computer, a laptop computer, a tablet computer, a television/monitor paired with a separate handheld orientation/location apparatus, or any suitable combination thereof.

As shown in FIG. 2, the orientation module 50 of the device 14 of the preferred embodiment includes at least a real orientation portion and a user orientation portion. The real orientation portion of the orientation module 50 preferably functions to provide a frame of reference for the device 14 as it relates to a world around it, wherein the world around can include real three dimensional space, a virtual reality space, an augmented reality space, or any suitable combination thereof. As noted below, the projection matrix can preferably include a mathematical representation of an arbitrary orientation of a three-dimensional object (i.e., the device 14) having three degrees of freedom relative to a second frame of reference. As noted in the examples below, the projection matrix can include a mathematical representation of the device 14 orientations in terms of its Euler angles (pitch, roll, yaw) in any suitable coordinate system.

In one variation of the device 14 of the preferred embodiment, the second frame of reference can include a three-dimensional external frame of reference (i.e., real space) in which the gravitational force defines baseline directionality for the relevant coordinate system against which the absolute orientation of the device 14 can be measured. In such an example implementation, the device 14 will have certain orientations corresponding to real world orientations, such as up and down, and further such that the device 14 can be rolled, pitched, and/or yawed within the external frame of reference. Preferably, the orientation module 50 can include a MEMS gyroscope configured to calculate and/or determine a projection matrix indicative of the orientation of the device 14. In one example configuration, the MEMS gyroscope can be integral with the orientation module 50. Alternatively, the MEMS gyroscope can be integrated into any other suitable portion of the device 14 or maintained as a discrete module of its own.

As shown in FIG. 2, the user orientation portion of the orientation module 50 preferably functions to provide a frame of reference for the device 14 relative to a point or object in space, including a point or object in real space. Preferably, the user orientation can include a measurement of a distance and/or rotational value/s of the device relative to a nodal point. In another variation of the device 14 of the preferred embodiment, the nodal point can include a user's head such that the user orientation includes a measurement of the relative distance and/or rotational value/s of the device 14 relative to a user's field of view. Alternatively, the nodal point can include a portion of the user's head, such as for example a point between the user's eyes. In another alternative, the nodal point can include any other suitable point in space, including for example any arbitrary point such as an inanimate object, a group of users, a landmark, a location, a waypoint, a predetermined coordinate, and the like. Preferably, as shown in FIG. 1, the user orientation portion of the orientation module 50 can function to create a viewing relationship between a viewer 12 (optionally located at the nodal point) and the device 14, such that a change in user orientation can cause a consummate change in viewable content consistent with the user's VAR interaction, i.e., such that the user's view through the frame will be adjusted consistent with the user's orientation relative to the frame.

As shown in FIG. 2, one variation of the device 14 of the preferred embodiment includes a location module 60 connected to the processor 70 and the orientation module 50. The location module 60 of the preferred embodiment functions to determine a location of the device 14. As noted above, location can refer to a geographic location, which can be indoors, outdoors, above ground, below ground, in the air or on board an aircraft or other vehicle. Preferably, as shown in FIG. 2, the device 14 of the preferred embodiment can be connectable, either through wired or wireless means, to one or more of a satellite positioning system 82, a local area network or wide area network such as a WiFi network 80, and/or a cellular communication network 84. A suitable satellite position system 82 can include for example the Global Positioning System (GPS) constellation of satellites, Galileo, GLONASS, or any other suitable territorial or national satellite positioning system. In one alternative embodiment, the location module 60 of the preferred embodiment can include a GPS transceiver, although any other type of transceiver for satellite-based location services can be employed in lieu of or in addition to a GPS transceiver.

The processor 70 of the device 14 of the preferred embodiment functions to manage the presentation of the VAR scene to the viewer 12. In particular, the processor 14 preferably functions to display a scene to the viewer 12 on the display 40 in response to the real orientation and the user orientation. The processor 70 of the preferred embodiment can be configured to process, compute, calculate, determine, and/or create a VAR scene that can be displayed on the device 14 to a viewer 12, wherein the VAR scene is oriented to mimic the effect of the viewer 12 viewing the VAR scene as if through the frame of the device 12. Preferably, orienting the scene can include preparing a VAR scene for display such that the viewable scene matches what the user would view in a real three-dimensional view, that is, such that the displayable scene provides a simulation of real viewable space to the viewer 12 as if the device 14 were a transparent frame. As noted above, the scene is preferably a VAR scene; therefore it can include one or more virtual and/or augmented reality elements composing, in addition to, and/or in lieu of one or more real elements (buildings, roads, landmarks, and the like, either real or fictitious). Alternatively, the scene can include processed or unprocessed images/videos/multimedia files of one or more displayable scene aspects, including both actual and fictitious elements as noted above. Preferably, the device 14 can be configured in any suitable combination of hardware, firmware, and/or software for both embedding and activating media links within the displayable VAR scenes according to any of the preferred methods and variations thereof.

2. Methods

Figure 3:
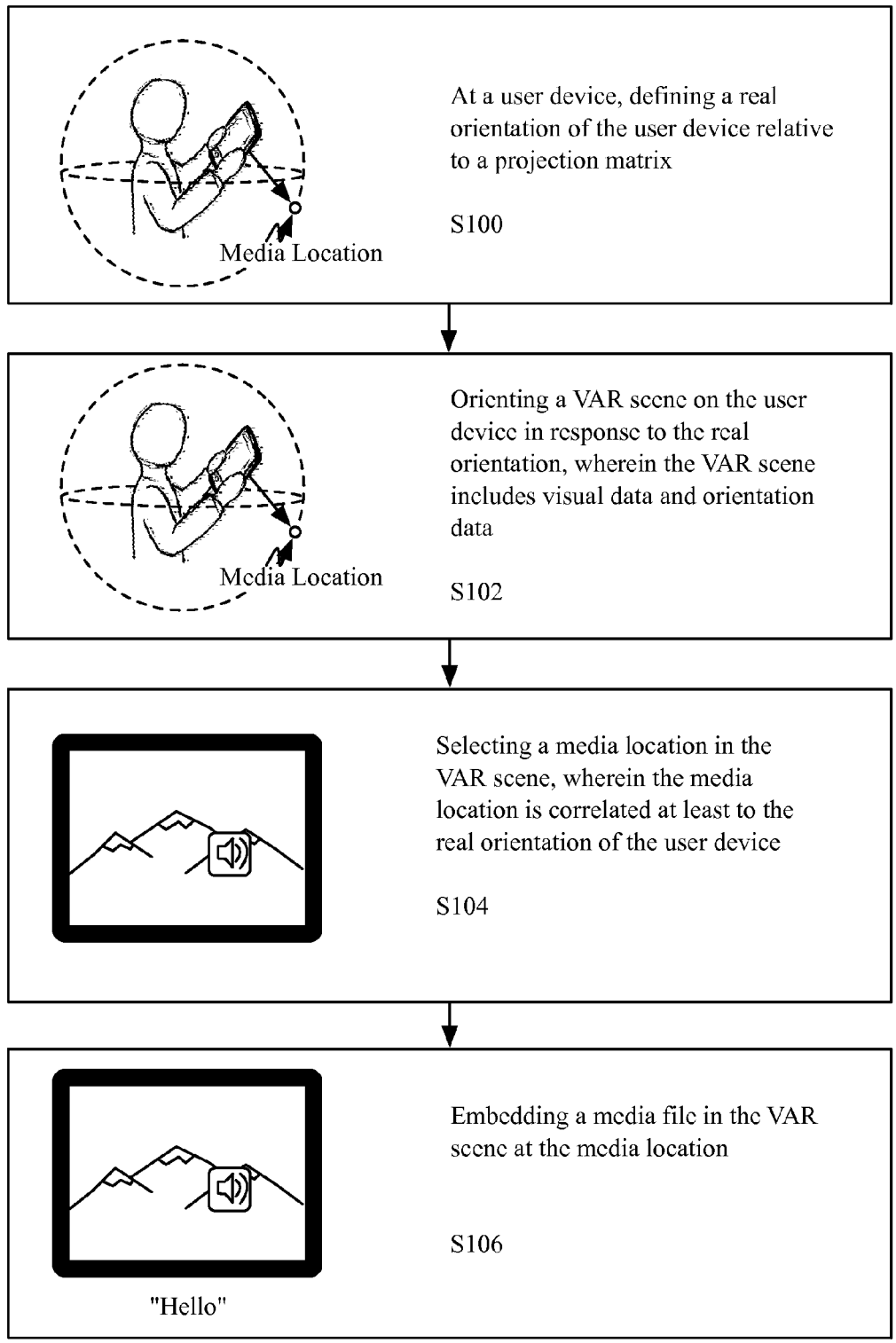
FIG. 3 is a flowchart depicting a method for embedding a media file in a VAR scene according to a preferred embodiment of the present invention.

As shown in FIG. 3, a method according to a first preferred embodiment can include: at a user device, defining a real orientation of the user device relative to a projection matrix in block S100; orienting a VAR scene on the user device in response to the real orientation in block S102. Preferably, the VAR scene includes at least visual data and orientation data. The first preferred method can further include selecting a media location in the VAR scene in block S104; and embedding a media file in the VAR scene at the media location in block S106. Preferably, the media location in correlated at least to the real orientation of the user device. The first preferred method functions to allow a user to embed, tag, link, and/or associate a secondary media file with a VAR scene with which the user is interacting. Preferably, the first preferred method can be performed on a user device of the type described above with reference to FIGS. 1 and 2.

As shown in FIG. 3, the first preferred method can include block S100, which recites defining a real orientation of the user device relative to a projection matrix. Block S100 preferably functions to determine a physical orientation of the user device relative to an external frame of reference with which a secondary or additional media element is to be associated. Preferably, the physical orientation of the user device can include the real orientation of the user device as calibrated relative to an external three-dimensional frame of reference. A suitable external frame of reference can include a natural frame of reference in which a vertical axis is defined substantially collinearly with a gravitational pull on the user device. Alternatively, the user device can be configured to set and/or establish any suitable frame of reference and/or rotation or permutation thereof in determining the real orientation of the user device. Alternatively, block S100 can further include determining a location of the user device, wherein the location can include a geographic location, which can be indoors, outdoors, above ground, below ground, in the air or on board an aircraft or other vehicle. In other variations of the first preferred method, the real orientation and/or the location can include a fictional frame of reference and/or location, such as within a VAR scene related to a film or novel.

One variation of the first preferred method can further include defining a user orientation of the user device relative to a nodal point. As noted above, the user orientation can include a measurement of a distance and/or rotational value/s of the device relative to a nodal point. Preferably, the nodal point can include a user's head such that the user orientation includes a measurement of the relative distance and/or rotational value/s of the device relative to a user's field of view. Alternatively, the nodal point can include a portion of the user's head, such as for example a point between the user's eyes. In another alternative, the nodal point can include any other suitable point in space, including for example any arbitrary point such as an inanimate object, a group of users, a landmark, a location, a waypoint, a predetermined coordinate, and the like. Preferably, determining the user orientation functions to create a viewing relationship between a user and/or viewer (optionally located at the nodal point) and the device, such that a change in user orientation can cause a consummate change in viewable content consistent with the user's VAR interaction, i.e., such that the user's view through the frame will be adjusted consistent with the user's orientation relative to the frame.

As shown in FIG. 3, the first preferred method can further include block S102, which recites orienting a VAR scene on the user device in response to the real orientation. Block S102 preferably functions to render, configure, calculate, compute, and/or display the VAR scene to the user in response to at least the real orientation of the user device. Preferably, the VAR scene includes both visual data and orientation data, such that the portion of the scene that is displayable to the user is a function of the real orientation of the user device. Preferably, the portion of the VAR scene that is displayable by the user device corresponds to an overlap between a viewing frustum of the device (i.e., a viewing cone projected from the device) and the imaginary sphere that includes the spherical image as shown in FIG. 1. As noted above, the VAR scene is preferably a portion of the spherical image, which can include a substantially rectangular display of a concave, convex, or hyperbolic rectangular portion of the sphere of the spherical image. Preferably, the nodal point can be disposed at approximately the origin of the spherical image, such that a user/viewer has the illusion of being located at the center of a larger sphere or bubble having the VAR scene displayed on its interior. Alternatively, the nodal point can be disposed at any other suitable vantage point within the spherical image displayable by the device. In another alternative, the displayable scene can include a substantially planar and/or ribbon-like geometry from which the nodal point is distanced in a constant or variable fashion. Preferably, block S102 can be performed within a 3D or 2D graphics platform such as OpenGL, WebGL, or Direct 3D. Alternatively, the orientation and/or display of the VAR scene can be performed within a browser environment using one or more of Flash, HTML5, CSS3, or any other suitable markup language. In another variation of the first preferred method, the geometry of the displayable scene can be altered and/or varied in response to an automated input and/or in response to a user input.

As shown in FIG. 3, the preferred method can further include block S104, which recites selecting a media location in the VAR scene and wherein the media location is correlated at least to the real orientation of the user device. Block S104 preferably functions to establish in the VAR scene a particular location, correlated to a particular orientation of the user/viewer device, at which the media file can be disposed for embedding and subsequent viewing and/or interaction by a viewer. Preferably, block S104 can be performed at the user device in conjunction with a user manipulating the user device to change the portion of the VAR scene that is displayed on the user device as described above. Upon orienting the VAR scene at the desired location, the user device can respond to one or more user inputs to locate and/or register the media location as correlated to any combination of the real orientation, the user orientation, and/or the user device location. Suitable user inputs can include for example a touch, keystroke input, gesture, voice command, and/or any suitable combination thereof. In one variation of the first preferred method, the media location can include a range in display space correlated to a pixel area of the display which in turn correlates to a real orientation range of the projection matrix of the user device, which can be matrix analogs to ranges of associated pitch, roll, and yaw values for the user device.

In another variation of the first preferred method, the media location can be further correlated to a depth value within the VAR scene. Preferably depth is communicated through either varying scale of the link data or by varying the Z depth of the link (e.g., when rendered on top of and after the rest of the VAR scene). An alternative approach, enabling out of order drawing, includes rendering the VAR scene close (i.e., inside a photosphere) and scaling according to the perspective transform along the plane formed by the X axis and Y axis. Any suitable technique for generating a depth value can be used, including a user input such as a touch, keystroke input, gesture, voice command, or other manipulation of the user device. Alternatively, the depth value can be determined solely in response to one or more of the user device real orientation, user orientation, and/or the location of the VAR scene.

In another variation of the preferred method, block S104 can further include assigning a location to the VAR scene, which can include for example receiving an input from an authoring tool in assigning a location of the VAR scene. Authoring can include indicating location during authoring the VAR scene or while viewing a previously created VAR scene. For example, while creating a VAR scene on a mobile device, the user can initiate the assignment of a location by orientating the device in the desired location and then recording an audio clip. The audio clip will now be assigned that location within the VAR scene. Similarly, links, text, multimedia, and other forms of media can be authored in any suitable manner. In another variation of the preferred method, a location module of the type described above can automatically generate the location. For example, if an additional image is to be added to the VAR scene, and the image was taken from substantially similar geographic location include, then image processing can be employed to align the image with a corresponding view from the VAR scene. Similarly if the media has location information enabling relative positioning of the VAR scene and the media, then the location can be determined through the relative positioning. For example, if a second VAR scene is directly north of a first VAR scene, then the second VAR scene can be assigned a location in the northern portion of the first VAR scene. In another example implementation, selecting the media location of the second VAR scene can further include determining a location of the second VAR scene and locating the second VAR scene at its location within the VAR scene. For example, if the VAR scene is a Golden Gate Bridge VAR scene and the second VAR scene is a VAR scene at the North tower of the Golden Gate Bridge, then the media location of the second VAR scene can be automatically or manually located at the North tower in the VAR scene. Accordingly, viewer selection of the North tower can link the viewer directly to the second VAR scene.

As shown in FIG. 3, the preferred method can further include block S106, which recites embedding a media file in the VAR scene at the media location. Preferably, the media file can include any one of an image file, a video file, an audio file, a second VAR scene, a second rendering of the VAR scene, a hyperlink, or any other suitable type of ancillary media the content of which was not originally captured in the VAR scene. Alternatively, a hyperlink can be configured to direct the viewer device to the media file. In another alternative, the media file can include an embedded media fragment that optionally can include a fully qualified file format. For example, a viewer can click on or otherwise select the hyperlink which directs the viewer device to the media file, which can include any one of an image file, a video file, an audio file, a second VAR scene, a second rendering of the VAR scene, and/or a second hyperlink to still more media file/s. The media file can be embedded into the VAR scene using any suitable process, algorithm, software suite, programming language, or application programming interface (API) including for example any suitable combination of OpenGL, WebGL, Direct 3D, Flash, HTML5, and/or CSS3. Additionally or alternatively, block S106 can include embedding the media file in the VAR scene in more than one type of format, such that the media file can be accessed when the viewer device is operating in different locations or under different conditions (e.g., with or without access to WiFi or high-speed cellular network communications). Additionally or alternatively, the media can be rendered directly into the VAR scene such as an image positioned in a VAR scene. Flash or HTML5 can be used to render the media links. For example uniform resource identifier (URI) links can be represented in a VAR scene with Flash, HTML or any other markup language, and Flash or HTML5 transforms or other suitable methods can be used to render the media links.

Figure 4:
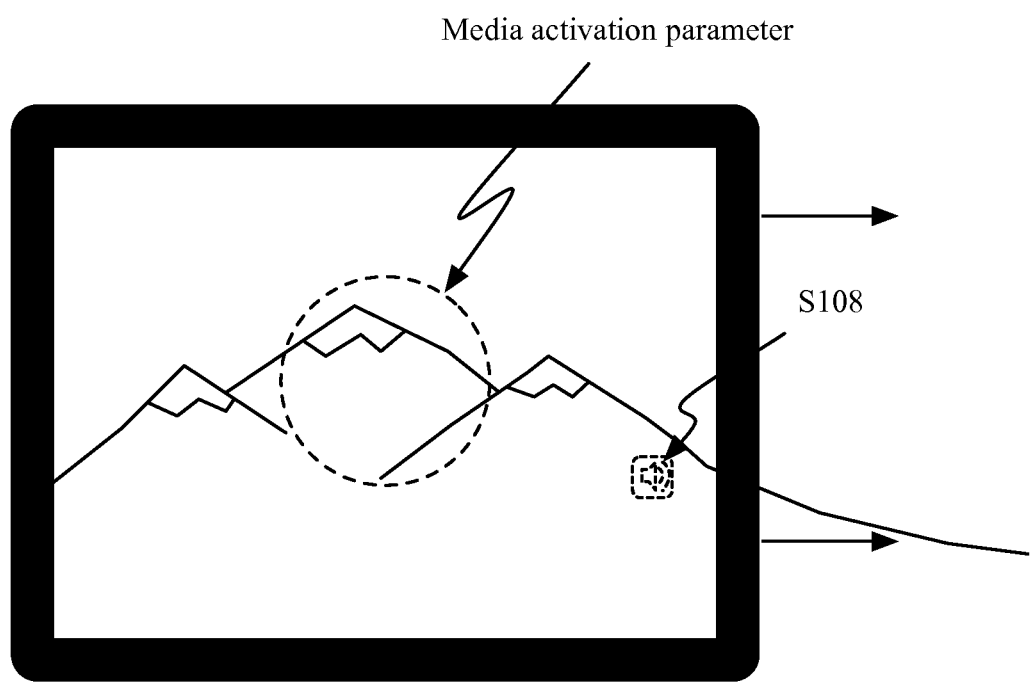
FIG. 4 is a schematic diagram of the method for embedding a media file in a VAR scene according to a variation of the preferred embodiment of the present invention.
Figure 6:
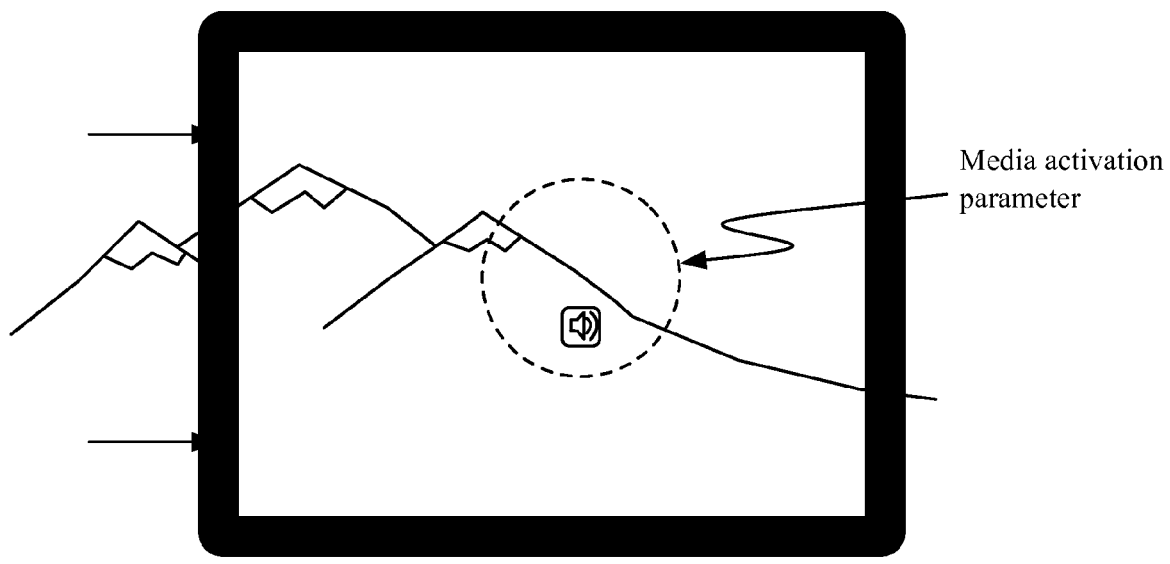
FIG. 6 is a schematic diagram of the method for viewing a media file in a VAR scene according to a variation of the preferred embodiment of the present invention.

As shown in FIG. 4, the preferred method can further include block S108, which recites associating a media activation parameter with the media file. Block S108 preferably functions to correlate, generate, calculate, monitor, maintain, and/or associate a media activation parameter with the media file and/or the associated media location. Preferably, the media activation parameter can include any suitable user interface through which the user/viewer can activate the media file. For example, the media activation parameter can include a receivable user input, such as a touch, keystroke input, gesture, voice command, or other manipulation of the user device. In the example embodiment shown in FIG. 4, the media activation parameter can include an activation area, the location of which defined by the orientation of the device relative to the VAR scene. Preferably, the activation area is displayable within the VAR scene such that through manipulation of the orientation of the VAR scene, the activation area can be substantially overlapping with the media file and thus activate the media file. As shown in FIG. 6, reorientation of the device such that activation area surrounds or otherwise at least partially overlaps the media file can result in activation of the media file, in this case an audio file that recites, "Here are the Rocky Mountains."

Preferably, the activation area is disposed substantially in and around the center of the display, i.e., the activation area is a fixed range of pixels displayable in or around the center of the display. The size of the activation area can be related to the size of the display of the device on which the VAR scene is being rendered, whether a user device or a viewer device. Alternatively, the size of the activation area can be related to the number of and/or spatial density of media files. For example, if a VAR scene has a large number of selectable media files that are densely located, then the activation area can be relatively small to permit precise selection of the desired media file. Alternatively, if the VAR scene has relatively few or sparsely located media files, then the activation area can be relatively large thus permitting a viewer greater latitude in selecting the desired media file. Accordingly, as the VAR scene is traversed by the user/viewer, the portions of the VAR scene disposed within the activation area will change accordingly. As the media file, which is embedded at the media location selected in block S104, is displayed within the activation area the media file will be activated. Activation of the media file can include any suitable action depending upon the type of media file that is being activated, such as playing the media file if it is an audio or video file, rendering an image file, following a hyperlink, and/or rendering and displaying a second VAR scene. The activation area can be used alone or in combination with other means or mechanisms for activating the media file, including at least touch, keypad, and voice enabled interaction with the VAR scene.

Figure 5:
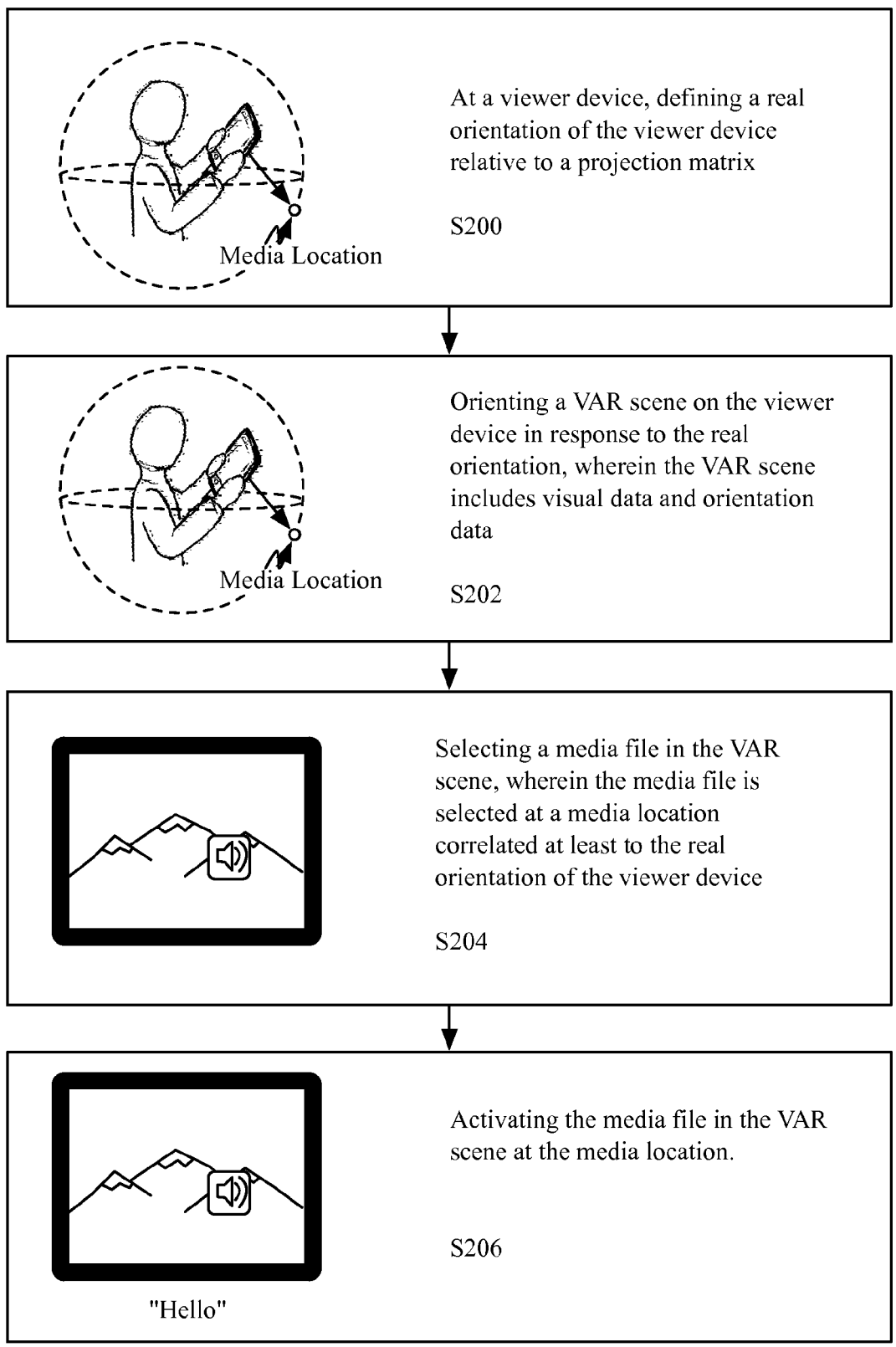
FIG. 5 is a flowchart depicting a method for viewing a media file in a VAR scene according to a preferred embodiment of the present invention.

As shown in FIG. 5, a second preferred method can include at a viewer device, defining a real orientation of the viewer device relative to a projection matrix in block 200; and orienting a VAR scene on the viewer device in response to the real orientation in block S202. Preferably, the VAR scene includes one or both of visual data and orientation data. The second preferred method can further include selecting a media file in the VAR scene, wherein the media file is selected at a media location correlated at least to the real orientation of the viewer device in block S204; and activating the media file in the VAR scene at the media location in block S206. The second preferred method functions to allow a viewer to interact with media that is embedded, tagged, linked, and/or associated with a VAR scene viewable on the viewer device.

Preferably, the second preferred method can be performed on a viewer device of the type described above with reference to FIGS. 1 and 2.

As shown in FIG. 5, the second preferred method can include block S200, which recites defining a real orientation of the viewer device relative to a projection matrix. Block S200 preferably functions to determine a physical orientation of the viewer device relative to an external frame of reference with which a secondary or additional media element is to be associated. Preferably, the physical orientation of the viewer device can include the real orientation of the viewer device as calibrated relative to an external three-dimensional frame of reference. As noted above, a suitable external frame of reference can include a natural frame of reference in which a vertical axis is defined substantially collinearly with a gravitational pull on the viewer device. Alternatively, the viewer device can be configured to set and/or establish any suitable frame of reference and/or rotation or permutation thereof in determining the real orientation of the viewer device. Alternatively, block S200 can further include determining a location of the viewer device, wherein the location can include a geographic location, which can be indoors, outdoors, above ground, below ground, in the air or on board an aircraft or other vehicle. In other variations of the second preferred method, the real orientation and/or the location can include a fictional frame of reference and/or location, such as within a VAR scene related to a film or novel.

One variation of the second preferred method can further include defining a user orientation of the viewer device relative to a nodal point. As noted above, the user orientation can include a measurement of a distance and/or rotational value/s of the device relative to a nodal point. Preferably, the nodal point can include a viewer's head such that the user orientation includes a measurement of the relative distance and/or rotational value/s of the device relative to a viewer's field of view. Alternatively, the nodal point can include a portion of the viewer's head, such as for example a point between the viewer's eyes. In another alternative, the nodal point can include any other suitable point in space, including for example any arbitrary point such as an inanimate object, a group of users, a landmark, a location, a waypoint, a predetermined coordinate, and the like. Preferably, determining the user orientation functions to create a viewing relationship between a viewer (optionally located at the nodal point) and the device, such that a change in user orientation can cause a consummate change in viewable content consistent with the user's VAR interaction, i.e., such that the viewer's view through the frame will be adjusted consistent with the viewer's orientation relative to the frame.

As shown in FIG. 5, the second preferred method can further include block S202, which recites orienting a VAR scene on the viewer device in response to the real orientation. Block S202 preferably functions to render, configure, calculate, compute, and/or display the VAR scene to the viewer in response to at least the real orientation of the viewer device. As noted above, the VAR scene preferably includes both visual data and orientation data, such that the portion of the scene that is displayable to the viewer is a function of the real orientation of the viewer device. Preferably, the portion of the VAR scene that is displayable by the viewer device corresponds to an overlap between a viewing frustum of the device (i.e., a viewing cone projected from the device) and the imaginary sphere that includes the spherical image as shown in FIG. 1. As noted above, the VAR scene is preferably a portion of the spherical image, which can include a substantially rectangular display of a concave, convex, or hyperbolic rectangular portion of the sphere of the spherical image. Preferably, the nodal point can be disposed at approximately the origin of the spherical image, such that a user/viewer has the illusion of being located at the center of a larger sphere or bubble having the VAR scene displayed on its interior. Alternatively, the nodal point can be disposed at any other suitable vantage point within the spherical image displayable by the device. In another alternative, the displayable scene can include a substantially planar and/or ribbon-like geometry from which the nodal point is distanced in a constant or variable fashion. Preferably, block S202 can be performed within a 3D or 2D graphics platform such as OpenGL, WebGL, or Direct 3D. Alternatively, the orientation and/or display of the VAR scene can be performed within a browser environment using one or more of Flash, HTML5, CSS3, or any other suitable markup language. In another variation of the second preferred method, the geometry of the displayable scene can be altered and/or varied in response to an automated input and/or in response to a viewer input.

As shown in FIG. 5, the second preferred method can further include block S204, which recites selecting a media file in the VAR scene, wherein the media file is selected at a media location correlated at least to the real orientation of the user device. Block S204 preferably functions to allow a viewer to interact with, choose, and/or select a media file in the VAR scene at particular location correlated to a particular orientation of the viewer device. Preferably, block S204 can be performed at the viewer device in conjunction with a viewer manipulating the viewer device to change the portion of the VAR scene that is displayed on the viewer device as described above. Upon orienting the VAR scene at the desired location, the viewer device can respond to one or more viewer inputs to choose and/or select the media location as correlated to any combination of the real orientation, the user orientation, and/or the viewer device location. Suitable viewer inputs can include for example a touch, keystroke input, gesture, voice command, and/or any suitable combination thereof. In one variation of the second preferred method, the media location can include a range in display space correlated to a pixel area of the display which in turn correlates to a real orientation range of the projection matrix of the viewer device, which can be matrix analogs to ranges of associated pitch, roll, and yaw values for the viewer device. Accordingly, in response to the viewer orienting the viewer device in a particular orientation, the appropriate media file can be selected.

In another variation of the second preferred method, the media location can be further correlated to a depth value within the VAR scene. As noted above, preferably depth is communicated through either varying scale of the link data or by varying the Z depth of the link (e.g., when rendered on top of and after the rest of the VAR scene). A previously noted alternative approach, enabling out of order drawing, includes rendering the VAR scene close (i.e., inside a photosphere) and scaling according to the perspective transform along the plane formed by the X axis and Y axis. Any suitable technique for selecting a depth value can be used, including a user input such as a touch, keystroke input, gesture, voice command, or other manipulation of the viewer device. Alternatively, the depth value can be determined solely in response to one or more of the viewer device real orientation, user orientation, and/or the location of the VAR scene.

As shown in FIG. 5, the second preferred method can further include block S206, which recites activating the media file in the VAR scene at the media location. Preferably, the media file can include any one of an image file, a video file, an audio file, a second VAR scene, a second rendering of the VAR scene, a hyperlink, or any other suitable type of ancillary media the content of which was not originally captured in the VAR scene. Alternatively, a hyperlink can be configured to direct the viewer device to the media file. Alternatively, a hyperlink can be configured to direct the viewer device to the media file. In another alternative, the media file can include an embedded media fragment that optionally can include a fully qualified file format. For example, a viewer can click on or otherwise select the hyperlink which directs the viewer device to the media file, which can include any one of an image file, a video file, an audio file, a second VAR scene, a second rendering of the VAR scene, and/or a second hyperlink to still more media file/s. As noted above, the media file can be embedded into the VAR scene using any suitable process, algorithm, software suite, programming language, or application programming interface (API) including for example any suitable combination of OpenGL, WebGL, Direct 3D, Flash, HTML5, and/or CSS3. Preferably, activating the media file can include at least causing the media file to transmit/communicate its desired content, such as for example playing an audio or video file, displaying an image, retrieving a webpage, rendering and displaying a second VAR scene, and/or following a hyperlink. Additionally or alternatively, block S206 can include activating the media file in the VAR scene in more than one type of format, such that the media file can be accessed when the viewer device is operating in different locations or under different conditions (e.g., with or without access to WiFi or high-speed cellular network communications).

In another variation of the second preferred method, the media location of the second VAR scene can include a representation of the second VAR scene at its real location within the VAR scene. As noted above, if a second VAR scene is directly north of a first VAR scene, then the second VAR scene can be assigned a location in the northern portion of the first VAR scene. In another example implementation described above, selecting the media location of the second VAR scene can further include determining a location of the second VAR scene and locating the second VAR scene at its location within the VAR scene. For example, if the VAR scene is a Golden Gate Bridge VAR scene and the second VAR scene is a VAR scene at the North tower of the Golden Gate Bridge, then the media location of the second VAR scene can be automatically or manually located at the North tower in the VAR scene. Accordingly, viewer selection of the North tower can link the viewer directly to the second VAR scene.

Figure 7:
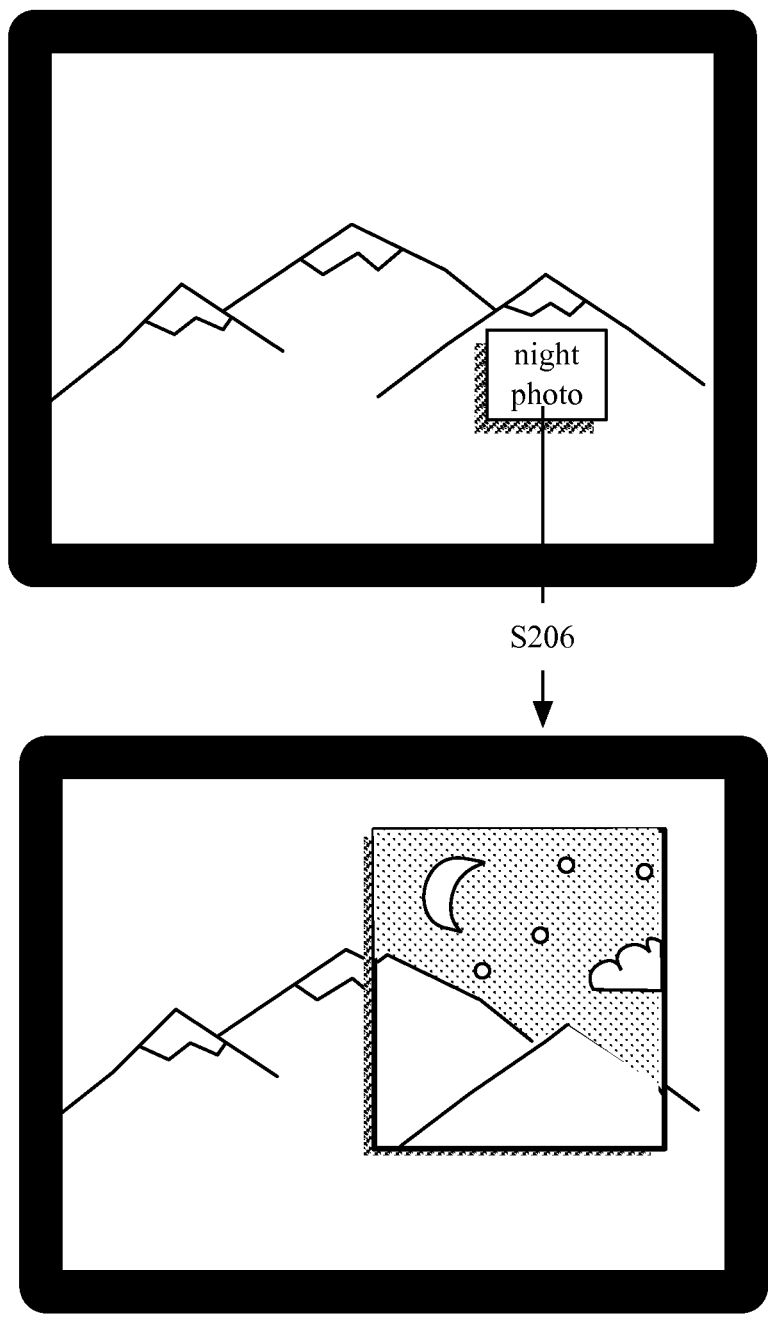
FIG. 7 is a schematic diagram of an example variation of the system and/or method of the preferred embodiment of the present invention.
Figure 8:
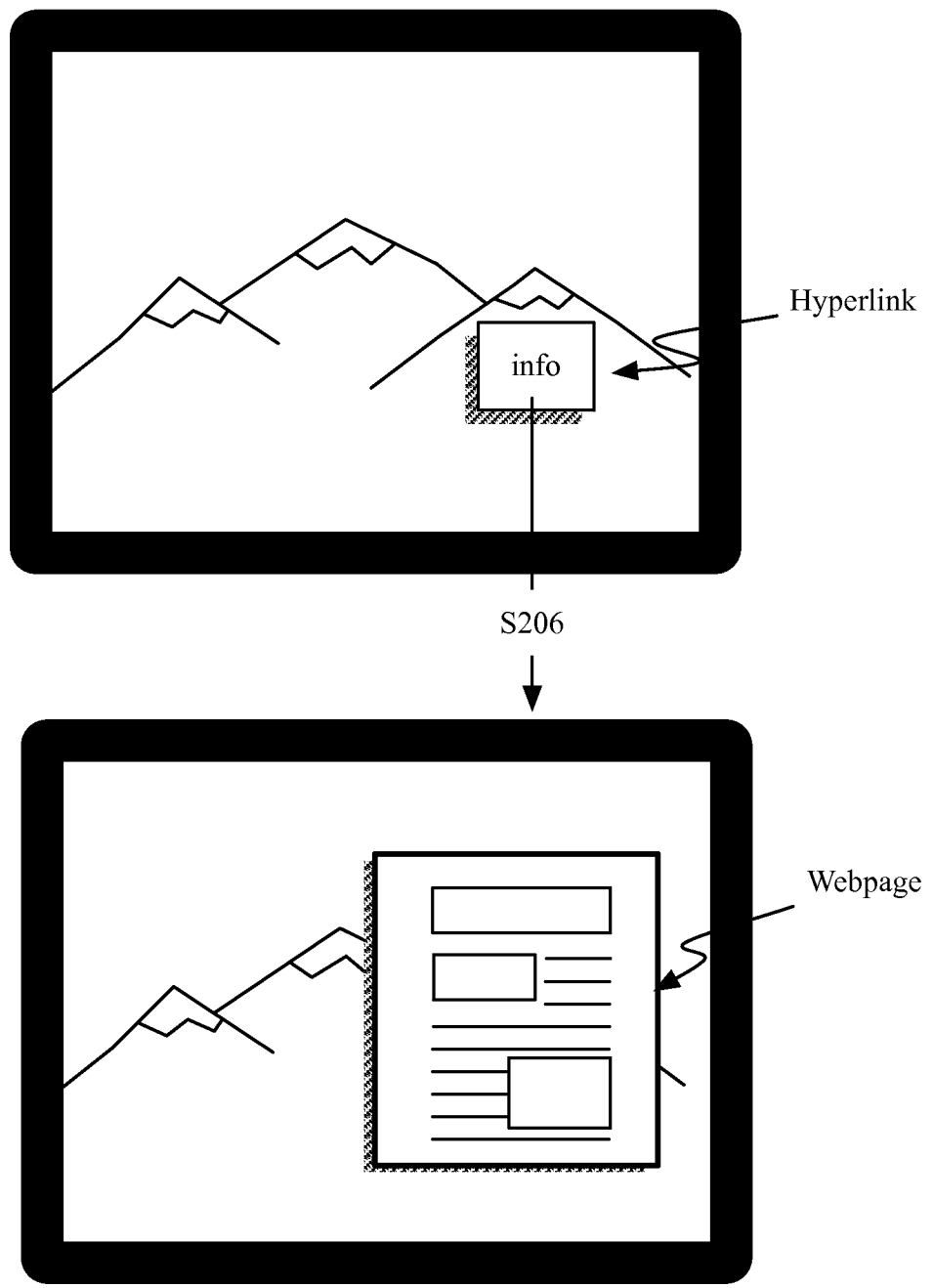
FIG. 8 is a schematic diagram of another example variation of the system and/or method of the preferred embodiment of the present invention.

As shown in FIGS. 6, 7, and 8, activation of example types of media files can result in the display and/or transmission of different types of media within the displayed VAR scene. FIG. 6 for example illustrates another variation of the second preferred method in which activation of the media file can include activating the media file in response to an orientation of the viewer device such that an activation area in the VAR scene overlaps the media file. As noted above, suitable media activation parameters can include any suitable user interface through which the user/viewer can activate the media file. For example, the media activation parameter can include a receivable user input, such as a touch, keystroke input, gesture, voice command, or other manipulation of the user device. In the example embodiment shown in FIGS. 4 and 6, the media activation parameter can include an activation area displayable within the VAR scene such that through manipulation of the orientation of the VAR scene, the activation area can be substantially overlapping with the media file and thus activate the media file. As shown in FIG. 6, reorientation of the device such that activation area surrounds or otherwise at least partially overlaps the media file can result in activation of the media file, in this case an audio file that recites, "Here are the Rocky Mountains." Similarly, activation of the example media file shown in FIG. 7 can result in the display of a nighttime image of the portion of the Rocky Mountains with which the media file is associated by location and/or user orientation. FIG. 8 by contrast illustrates an example webpage media file in which activation of the hyperlink causes retrieval and display of a webpage relating to the portion of the Rocky Mountains with which the media file (hyperlink) is associated by location and/or user orientation.

For audio (either a recording or audio channel from a video), binaural audio can be incorporated into the playback to simulate the audio originating from the location within the VAR scene. Thus, as the viewer changes the orientation of the viewer device to view different portions of the VAR scene the audio can continue but will use internal time and level differences or other binaural techniques to create the perception of the sound originating from a stationary point. For example, when looking north an audio file can be played sounding as if it is originating from a northerly source. When the viewer turns south to view other portions of the VAR scene, the sound can be transmitted as if it is still coming from a northerly direction behind the viewer. Similarly the volume of playback can change based on orientation such that the volume is greater when the audio link is in the center of the display and quieter when not viewed. The audio can alternatively be prepared such that a surround sound experience is created; in which case, the mixing of the audio alters depending on the orientation of the user/viewer. For video, images, or other visual media taken from substantially the same location, image processing can be used to align the image with the VAR scene imagery as described above.

In other variations of the preferred methods, the media file is preferably graphically represented via either text or graphics. For example, a sound media file can have a sound graphic positioned at the location of the sound file in the VAR scene. The media file can alternatively be generally hidden and selectively viewable in the VAR scene in response to the real orientation of the viewer device. The visibility of the media file can additionally be toggled in response to a real orientation or viewing mode of the viewer device. In other variations of the preferred methods, a predetermined real orientation, user orientation, and/or location of the device can activate interactive controls or a "hover" state of the media file. For example, when a second VAR scene link is substantially in the center of the display a text description, image preview, or other information relating to the second VAR scene can be displayed. Additionally or alternatively, activation or selection of the media file can cause the display of one or more media controls such as play or volume to permit further interaction with the media file.

In another variation of the preferred methods, activating a second VAR scene causes the display of transition between the two VAR scenes. Preferably the transition is a video of images showing the transition between the locations associated with the two VAR scenes. As an alternative, the displayed image of the current VAR scene can transition to an image of the second VAR scene in the same orientation. As another alternative, a graphical animation of moving between the location of the first VAR scene and the second VAR scene can be displayed on a map. The second VAR scene preferably has a reciprocating VAR scene link to allow a transition back to the original VAR scene. Preferably, a network of links between VAR scenes can be provided allowing exploration of spatial scenes while the user/viewer device remains in a single location. In other variations of the preferred methods, the links for the respective VAR scenes can be user generated or automatically created based on which VAR scenes are popular, close by, or interrelated in any other suitable way.

Additional variations of the preferred methods can additionally include automatically embedding a VAR scene, which functions to automatically populate a VAR scene with suitable links. A database or map of VAR scenes is preferably used to identify nearby, associated, and/or popular VAR scenes to which to link. The link to an identified VAR scene is preferably added and the location is preferably based on the relative geographic location of the two VAR scenes as described above. This automatic embedding of links preferably creates a navigable space from and between discrete VAR scenes. Additionally other content can be automatically included. For example, based on the location of the VAR scene links to other media files can be embedded. For example, if a VAR scene is near a restaurant, a link to a media file containing a review of that restaurant can be embedded and preferably positioned in the direction of the restaurant. Links from other nearby VAR scenes that were manually added can additionally be automatically embedded into a VAR scene. For example, if a nearby VAR scene has a link to media file containing an informative webpage, a VAR scene can embed that same informative webpage as its own media file. Outside content from other sources such as a social network with geo-tagged content can additionally be used to auto-populate a VAR scene with links to one or more media files.

The user and viewer devices 14 and methods of the preferred embodiment can be embodied and/or implemented at least in part as a machine configured to receive a computer-readable medium storing computer-readable instructions. The instructions are preferably executed by computer-executable components preferably integrated with the user/viewer device 14 and one or more portions of the processor 70, orientation module 50 and/or location module 60. Other systems and methods of the preferred embodiment can be embodied and/or implemented at least in part as a machine configured to receive a computer-readable medium storing computer-readable instructions. The instructions are preferably executed by computer-executable components preferably integrated by computer-executable components preferably integrated with a user/viewer device 14 of the type described above. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    determining a first orientation of a device within a three-dimensional space;
    determining a second orientation of the device relative to a nodal point, wherein the nodal point is at a first position within the three-dimensional space external to the device and corresponds to a user using the device;
    displaying a first portion of a virtual and augmented reality (VAR) scene on the device based on the first orientation and the second orientation, wherein the first portion of the VAR scene corresponds to an overlap between a viewing frustum projected from the nodal point and the VAR scene, and wherein the VAR scene includes visual data and orientation data;
    detecting a change in the first orientation of the device and detecting a change in a position of the nodal point from the first position to a second position within the three-dimensional space, wherein the change in the position of the nodal point causes the viewing frustum to overlap with a second portion of the VAR scene;
    displaying the second portion of the VAR scene on the device based on the detected change in the first orientation of the device and the detected change in the position of the nodal point;
    receiving a selection of a media location in the second portion of the VAR scene, wherein the selected media location is correlated to the first orientation of the device and the second orientation of the device when the selection is received; and
    embedding a media file in the VAR scene at the media location, wherein the media file is subsequently activatable when the device is oriented such that the second portion of the VAR scene is displayed.

2. The method of claim 1, wherein the selected media location is further correlated to a depth value within the VAR scene.

3. The method of claim 2, wherein the depth value is determined in response to a user input.

4. The method of claim 1, wherein the depth value is determined in response to the first orientation and the second orientation of the device while the selection of the media location occurs.

5. The method of claim 1, wherein the media file includes one of: an image file, a video file, an audio file, a second VAR scene, a second rendering of the VAR scene, or a hyperlink.

6. The method of claim 5, wherein activation of the hyperlink directs the device to the second VAR scene.

7. The method of claim 5, wherein selecting a media location of the second VAR scene includes determining the location of the second VAR scene and locating the second VAR scene at its location within the VAR scene.

8. The method of claim 1, further comprising: associating a media activation parameter with the media file.

9. The method of claim 8, wherein the media activation parameter includes an activation area such that within the VAR scene overlap between the activation area and the media file causes activation of the media file.

10. A method comprising:
    determining a first orientation of a device within a three-dimensional space;
    determining a second orientation of the device relative to a nodal point, wherein the nodal point is at a first position within the three-dimensional space external to the device and corresponds to a user using the device;
    displaying a first portion of a virtual and augmented reality (VAR) scene on the device based on the first orientation and the second orientation, wherein the first portion of the VAR scene corresponds to an overlap between a viewing frustum projected from the nodal point and the VAR scene, and wherein the VAR scene comprises visual data and orientation data;
    detecting a change in the first orientation of the device and detecting a change in a position of the nodal point from the first position to a second position within the three-dimensional space, wherein the change in the position of the nodal point causes the viewing frustum to overlap with a second portion of the VAR scene;
    displaying the second portion of the VAR scene on the device based on the detected change in the first orientation of the device and the detected change in the position of the nodal point;

receiving a selection of a media file embedded at a media location in the second portion of the VAR scene, wherein the media location is correlated to the first orientation of the device and the second orientation of the device when the media file was embedded, and wherein the media file is activatable when the device is oriented such that the second portion of the VAR scene is displayed; and activating the media file in the VAR scene at the media location.

11. The method of claim 10, wherein the selected media location is further correlated to a depth value within the VAR scene.

12. The method of claim 10, wherein the media file includes one of: an image file, a video file, an audio file, a second VAR scene, a second rendering of the VAR scene, or a hyperlink.

13. The method of claim 12, wherein activation of the hyperlink directs the device to the second VAR scene.

14. The method of claim 12, wherein a media location of the second VAR scene includes a representation of the second VAR scene at its real location within the VAR scene.

15. The method of claim 10, wherein activating the media file includes activating the media file in response to an orientation of the device such that an activation area in the VAR scene overlaps the media file.

* * * * *